UNITED STATES PATENT OFFICE 2,482,225

COPPER BASE ALLOYS

John Sykes, Enfield, England, assignor to Enfield Rolling Mills Limited, Enfield, England, a company of Great Britain No Drawing. Application March 13, 1945, Serial No. 582,579. In Great Britain April 26, 1944

10 Claims. (Cl. 75—159)

This invention relates to improvements in copper base alloys, the principal object being the provision of an alloy combining high strength with high electrical conductivity.

The improved alloy is particularly suited for use in the construction of contacting welding electrodes such as tips and wheels as used in resistance welding for the welding of aluminium and aluminium alloys.

The improved alloy according to the invention consists of from .5% up to 1.0% of tellurium, metallic nickel from .06% to 0.1%, up to 0.1% oxygen, the balance being copper. Optimum results are obtained where the alloy is to be used in the resistance welding of aluminium and aluminium alloys, when the tellurium content lies between .5% and .7%. The oxygen content is preferably kept between the limits 0.02% and 0.1%.

Silver may be added up to 0.05% replacing copper, whereby the softening temperature of the alloy may be raised.

According to the preferred method of procedure in producing the allow, the nickel is placed in the bottom of the crucible, the copper next introduced, and the whole melted under charcoal. The tellurium is then added either as the element or as a copper-tellurium master alloy, and thereafter the silver if used. The oxygen control is effected in any well known manner, e. g. by poling. The melt is cast into water-cooled moulds.

As an example only, an alloy of the following composition: tellurium 0.70%, metallic nickel 0.08%, oxygen 0.025%, balance copper, cast extruded and subsequently hard drawn to 1½ in. diameter rod, exhibited the following physical properties.

| | |
|---|---|
| 0.1% proof stress _____ tons per sq. inch _ _ | 16 |
| Maximum stress _____ do _ _ _ _ | 18.5 |
| Elongation _____ per cent _ _ | 12 |
| Brinell hardness _____ with 5 mm. ball _ _ | 120 |
| Electrical conductivity _ _ per cent I. A. C. S _ _ | 90 |

Up to the present time it is almost universal practice to employ ordinary high conductivity copper as the material for the contact electrodes in the resistance welding of aluminium and aluminium alloys.

Whilst high conductivity copper has the necessary high electrical conductivity for this purpose, the life of such electrodes is inconveniently short due in part to the rapidity of deformation of the electrodes but even more to the necessity for cleaning or dressing of the working surface of the electrode at very short intervals to remove fouling due to sticking or pick-up of firmly adhering material from the surface of the work. Such fouling has an adverse effect upon the contact resistance between the electrode and work and if not removed would prevent the production of satisfactory welds.

Attempts have been made from time to time to substitute other materials, including copper base alloys, for high conductivity copper for such electrodes, but with little or no success as is indicated by the continued almost exclusive use of high conductivity copper.

The improved alloy according to the invention, whilst of low cost to produce, possesses the high electrical conductivity essential to the satisfactory resistance welding of aluminium and its alloys. At the same time due to its high strength it offers a great increase in resistance to deformation as compared with high conductivity copper and furthermore, fouling of the electrode surface due to sticking or pick-up has been found to be much less rapid than when high conductivity copper is used, so that less frequent cleaning or dressing is called for with consequent increase in electrode life and saving in operatives time.

I claim:

1. A copper base alloy combining high strength with high electrical conductivity consisting of from 0.5% to 1.0% tellurium, from .06% to 0.1% metallic nickel, 0.02% to 0.1% oxygen and the balance copper.

2. A copper base alloy combining high strength with high electrical conductivity consisting of from 0.5% to 1.0% tellurium, from .06% to 0.1% metallic nickel, up to 0.05% silver, 0.02% to 0.1% oxygen and the balance copper.

3. A copper base alloy combining high strength with high electrical conductivity consisting of 0.7% tellurium, 0.08% metallic nickel, 0.025% oxygen and the balance copper.

4. An electrode comprising a copper base alloy combining high strength with high electrical conductivity consisting of from 0.5% to 1.0% tellurium, from .06 to 0.1% metallic nickel, 0.02% to 0.1% oxygen and the balance copper.

5. An electrode comprising a copper base alloy combining high strength with high electrical conductivity consisting of from 0.5% to 1.0% tellurium, from .06% to 0.1% metallic nickel up to 0.05% silver, 0.02% to 0.1% oxygen and the balance copper.

6. An electrode comprising a copper base alloy combining high strength with high electrical conductivity consisting of 0.7% tellurium, 0.08% metallic nickel, 0.025% oxygen and the balance copper.

7. A copper base alloy combining high strength with high electrical conductivity consisting of from 0.5 to 0.7% tellurium, from .06 to 0.1% metallic nickel, 0.02% to 0.1% oxygen and the balance copper.

8. A copper base alloy combining high strength with high electrical conductivity consisting of from 0.5 to 0.7% tellurium, from .06 to 0.1% metallic nickel, up to 0.05 silver, 0.02% to 0.1% oxygen and the balance copper.

9. An electrode comprising a copper base alloy combining high strength with high electrical conductivity consisting of from 0.5 to 0.7% tellurium, from .06 to 0.1% metallic nickel, 0.02 to 0.1% oxygen and the balance copper.

10. An electrode comprising a copper base alloy comprising high strength with high electrical conductivity consisting of from 0.5 to 0.7% tellurium, from .06 to 0.1% metallic nickel, up to 0.05% silver, 0.02 to 0.1% oxygen and the balance copper.

JOHN SYKES.

REFERENCES CITED

The following references are of record in the file of this patent:

UNITED STATES PATENTS

| Number | Name | Date |
| --- | --- | --- |
| 2,256,492 | Phillips | Sept. 23, 1941 |
| 2,268,958 | Hensel | Jan. 6, 1942 |
| 2,268,929 | Hensel | Jan. 6, 1942 |

OTHER REFERENCES

Journal of the Institute of Metals, vol. 68 (1942), page 349.

"Metals," by Carpenter and Robertson, 1939, vol. 2, page 1250.

"Engineering Non-Ferrous Metal and Alloys," by Aitchison and Barclay, page 118.